(12) United States Patent
Glover

(10) Patent No.: US 9,101,863 B2
(45) Date of Patent: *Aug. 11, 2015

(54) FILTERING MEDIUM AND METHOD FOR CONTACTING SOLIDS CONTAINING FEEDS FOR CHEMICAL REACTORS

(75) Inventor: John N. Glover, Houston, TX (US)

(73) Assignee: Crystaphase Products, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,236

(22) Filed: Nov. 21, 2011

(65) Prior Publication Data

US 2012/0211438 A1   Aug. 23, 2012

Related U.S. Application Data

(63) Continuation of application No. 09/320,950, filed on May 27, 1999, now Pat. No. 8,062,521.

(60) Provisional application No. 60/087,235, filed on May 29, 1998.

(51) Int. Cl.
*B01D 24/12* (2006.01)
*B01D 39/20* (2006.01)

(52) U.S. Cl.
CPC .................. *B01D 39/2068* (2013.01)

(58) Field of Classification Search
CPC .................................................. B01D 39/2068
USPC ............ 210/284; 502/527.17, 527.19, 527.21
See application file for complete search history.

(56) References Cited

U.S. PATENT DOCUMENTS 2,408,164 A * 9/1946 Foster ........................... 502/226
4,615,796 A * 10/1986 Kramer ......................... 208/146
8,062,521 B2 * 11/2011 Glover .......................... 210/284

FOREIGN PATENT DOCUMENTS

DE          35 39 195       *  5/1986

OTHER PUBLICATIONS

PTO 2000-2748 English translation of DE 35 39 195 A1 which was published May 1986.*

* cited by examiner

*Primary Examiner* — David Sorkin
(74) *Attorney, Agent, or Firm* — Greenberg, Traurig LLP

(57) ABSTRACT

A filtering medium and method for removing contaminants from an organic-based feed stream which includes the use of a layer of ceramic filter units having a plurality of elliptical or trisoidal openings extending therethrough to filter organic-based feed streams and to provide liquid distribution upstream of the catalyst beds.

2 Claims, 5 Drawing Sheets

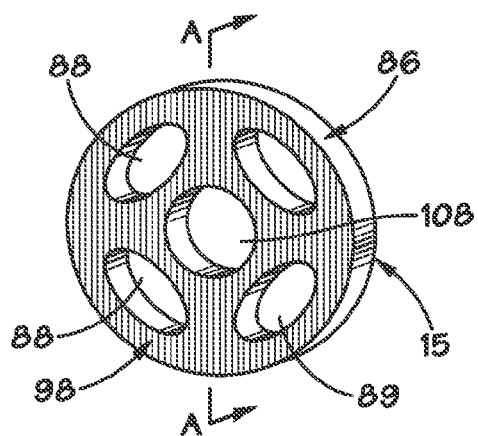
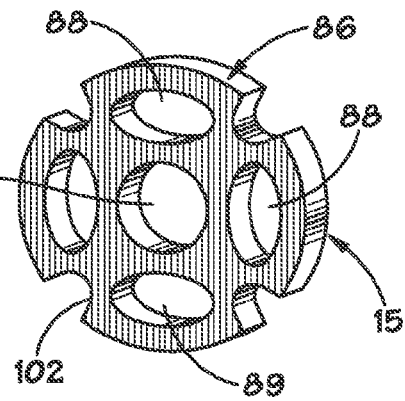
FIG. 4  FIG. 5
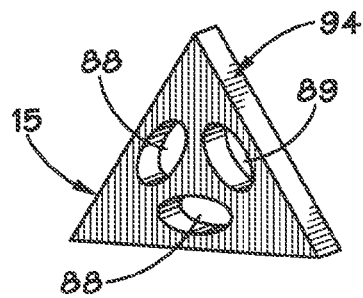
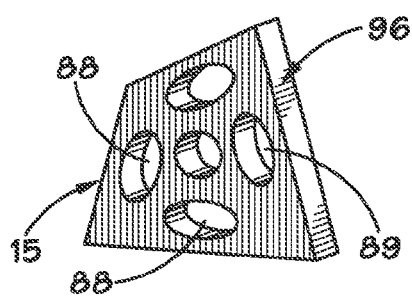
FIG. 6  FIG. 7
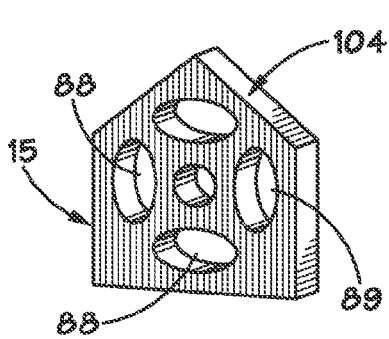
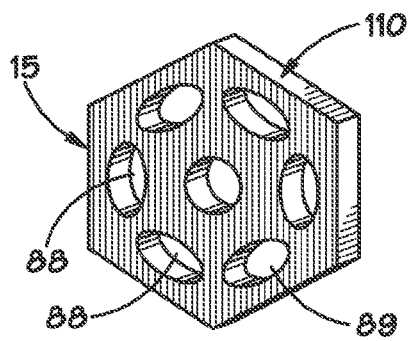
FIG. 8  FIG. 9

FILTERING MEDIUM AND METHOD FOR CONTACTING SOLIDS CONTAINING FEEDS FOR CHEMICAL REACTORS

RELATED APPLICATIONS

This continuation application claims the benefit, and priority benefit, of U.S. application Ser. No. 09/320,950 now U.S. Pat. No. 8,062,521, filed May 27, 1999, titled "Filtering Medium and Method for Contacting Solids Containing Feeds for Chemical Reactors," which claims the benefit, and priority benefit, of U.S. Provisional Patent Application Ser. No. 60/087,235, filed May 29, 1998, the contents of each of which are incorporated herein in their entirety.

BACKGROUND

1. Field of Invention

The invention relates to a filtering medium and method for filtering solids from organic-based feed streams to chemical reactors. In another aspect, this invention relates to a filtering medium and method for providing flow distribution of organic-based feed streams to chemical reactors. More particularly, the invention relates to a filtering medium and method for filtering solids and providing liquid distribution for organic-based feed streams that are subsequently processed in chemical reactors having discrete solid element catalyst bed(s). A further aspect of the invention relates to a filtering medium and method for partially reacting polymer precursors in organic-based feed streams to chemical reactors to reduce fouling of the solid element catalyst bed(s).

2. Description of the Related Art

Typically chemical reactor beds include discrete solid catalyst particles contained in one or more fixed beds. Often these beds are supported, or retained, at their inlet and/or outlet by materials which are inert to the reaction. These inert materials may trap all or some solid contaminants such as dirt, iron oxide, iron sulfide, asphaltenes, coke fines, catalyst fines, sediments or other entrained foreign particulate material in the reactor feed stream. The trapping of the contaminants is to prevent undesirable material from plugging, poisoning or otherwise deactivating the catalyst bed. The inert materials, or inerts, traditionally used are typically made of ceramic material in the form of pellets or spheres and typically must be resistant to crushing, high temperatures and/or high pressures. In addition, these materials may facilitate distribution of the feed stream across the catalyst bed in such a manner to reduce channeling through the catalyst bed.

For the last ten to fifteen years, high void fraction ceramic bed toppings, such as inert ceramic cylindrical filter units with cross sections of approximately $3/8$ inch thicknesses and approximately $1/2$ inch to $1\frac{1}{4}$ inches in diameter with five to ten internal holes of approximately $1/8$ inch size, the holes being round or triangular shaped, have been used on the top of fixed bed reactors processing organic feed streams. These bed toppings have been relatively successful at reducing pressure drops by improving liquid distribution. However, attempts to trap particulate matter have not been as successful. Catalyst bed plugging with contaminants such as dirt, iron oxide, iron sulfide, asphaltenes, coke fines, catalyst fines, sediments, or other entrained foreign particulate material remains to be a problem for the industry. Skimming, or removal, of the top portion of the catalyst is required when the filtering capacity of the bed topping or inerts is exhausted resulting in the catalyst itself being used as a filter. Thus, it is highly desirable to increase the efficiency of the inert bed filtration.

In addition to catalyst fouling by particulate matter in the organic-based stream, polymerization of polymer precursors, e.g., diolefins, found in the organic-based feed stream may also foul the catalyst. In particular, two mechanisms of polymerization, free radical polymerization and condensation-type polymerization, may cause catalyst bed fouling, gumming or plugging. The addition of antioxidants to control free radical polymerization has been found useful where the organic-based feed stream has encountered oxygen. Condensation polymerization of diolefins typically occurs after the organic-based feed is heated. Therefore, filtering prior to the organic-based feed stream entering the reactor may not be helpful to remove these foulants as the polymerization reactions generally take place in the reactors.

It is highly desirable to increase the efficiency of the inert bed filtration and to control the rate of reaction of the diolefins or other polymer precursors. Thus, the development of a filtering medium and method for filtration that increases the efficiency of the filtering of the contaminated feed stream may also reduce the pressure drop associated with plugging. The method of the present invention for filtration and flow distribution for chemical reactors, when compared with previously proposed prior art methods, has the advantages of: providing more efficient filtering; increasing catalyst life; decreasing catalyst losses; and reducing the need to take the reactor off-line for maintenance when removal or replacement of the inert material or any catalyst that is plugged is required. These benefits may result in both capital and operating savings.

Disadvantages associated with current filtration and liquid distribution designs and methods in fixed bed chemical reactors may result in poor liquid distribution to the catalyst bed. Partial plugging of the catalyst bed with contaminants, or gumming by reactive diolefins or other polymer precursors, may also cause maldistribution. The maldistribution may result in channeling and corresponding bypassing of portions of the catalyst bed, reducing the catalyst efficiency. Usually, a maldistribution problem is evidenced by radial temperature differences across the reactor. Therefore, the art has sought a medium and method for flow distribution that may spread the liquid more uniformly across and subsequently through the catalyst bed, provide efficient filtering and reduce fouling caused by undesired polymerization reactions.

Accordingly, prior to the development of the present invention, filtering media and methods for filtering, or distributing, organic-based feed streams to chemical reactors had limited abilities to provide both feed distribution and filtering capacity without plugging or blinding. Relatively large pressure drops across the filtering and/or distribution media of the previous apparatus and methods require excessive capital and operating costs and cause process safety and environmental concerns arising from maintenance required shutdowns and start-ups. Therefore, the art has sought a method for extending the run life of catalyst beds by filtering and distributing organic-based feed streams to chemical reactors which does not: require excessive amounts of catalyst; cause relatively large pressure drops across the bed; require relatively large capacity circulation pumps or compressors; and cause process safety and environmental concerns arising from reactor shutdowns and start-ups.

SUMMARY OF THE INVENTION

In accordance with the invention, the foregoing advantages may be achieved through the present media and methods of filtering and distributing an organic-based feed for chemical reactors. The filtering medium of the present invention includes a plurality of ceramic filter units, at least some of the ceramic filter units having a plurality of openings extending therethrough, and at least some of the openings selected from the group of ellipses or trisoids. The elliptical and trisoidal shaped openings are believed to increase particulate trapping. The elliptical and trisoidal shaped openings create an area of reduced liquid velocity, similar to that in a bend of a river. Sedimentation may occur on the inside of the turn, or river bend, while no particulate trapping occurs on the outside of the turn. The ceramic filter units may be made from any commercially available ceramic precursors including fire clays such as ball clay or silicate-aluminum clays such as montmorillonite clays or preferably, kaolinite clay. Optionally, ceramic precursor powders such as cordierite, mullite, zirconia stabilized with magnesia or calcia, zirconia toughened alumina, and the like may be used. The ceramic filter units may be formed by molding, stamping, pressing or preferably, by extrusion.

The ceramic filter units of the present invention may have a thickness from about ⅛ to 1½ inches, preferably from about ¼ to ½ inches, more preferably from about ¼ to ⅜ inches. An additional feature of the present invention may include ceramic filter units in a variety of shapes. The shapes may include irregular or closed plane cross-sectional configurations, including but not limited to ellipses and circles, or substantially any polygonal configuration, such as triangles, quadrilaterals, and pentagons, among others. The closed plane cross-sectional configurations may have widths of about ¼ to 3 inches at the widest point. Polygonal cross-sectional configurations used may include sides having lengths of about ⅛ to 3 inches. In particular, substantially circular cross-sectional configurations of about ¼ to 3 inch diameters; ellipses having minor axes of about ¼ to 2 and major axes ranging from about ⅜ to 3 inches; square cross-sectional configurations of about ¼ to 3 inch and rectangles having lengths of about ¼ to 3 inches, and widths of about ¼ to 3 inches may be used.

The periphery surface of the ceramic filter units may be provided with flutes. As used herein, the term flutes encompasses both flutes and grooves. The ceramic filter units also have top and bottom surfaces. These top and bottom surfaces are generally smooth. However, another feature of the present invention may include contacting the solid particles with the ceramic filter units have top and bottom surfaces, wherein at least one of the top and bottom surfaces are irregularly shaped. A preferred embodiment has irregularity shaped top and bottom surfaces which have ridges, rounded beads, or waves. The irregular surfaces provide protruding areas to contact the entrained solids, reducing the particle velocity below of the fluid, effectively removing entrained solids. The liquid flowing over the irregular surface is induced to form eddies, which in turn forces more entrained solids to contact the ceramic filter units' irregular surface, removing more entrained solids. Another feature of this aspect of the preset invention is that the amplitude and length of the waves of ridges may be adjusted based upon the particles sizes, fluid velocity and viscosity.

The number and size of the plurality of openings may be varied to change the void fraction of the filter unit, the void fraction of the filter unit being measured as the sum of the areas of openings divided by one cross-sectional area including the area of the openings. The void area of the ceramic filter units may range from about 20 to 70 percentage void area, preferably from about 40 to 65 percentage void area, more preferably from about 50 to 65 percentage void area.

Another feature of the present invention is to vary the packing factor of the ceramic filter units to affect filtration of varying particle sizes, wherein the packing factor is measured by dividing the surface area of the randomly packed filter units (all surfaces) in square feet by the volume unoccupied by the randomly packed filter units (hereinafter called "void volume") as measured the volume of water at 60° F. required to fill one randomly packed cubic foot. The packing factor may range from about 200 to 500 $ft_2/ft_3$, preferably from about 220 to 450 $ft_2/ft_3$, more preferably from about 240 to 400 $ft_2/ft_3$. In accordance with the invention, the size, shape and void fraction of the ceramic filter units may be varied to change the packing factor of the randomly dumped ceramic filter unit layers.

In accordance with another aspect of the present invention, at least some of the ceramic filter units are formed of a ceramic which may comprise a substrate having a substantially uniform coating of a selected catalyst including a porous alumina coating with a Group VI-B metal or a Group VIII metal, or both. Preferably, the Group VI-B metal is molybdenum and preferably, the Group VIII metal is either nickel or cobalt. More preferably, the Group VI-B metal and Group VIII metal are impregnated into at least some of the ceramic filter units. This embodiment of the media of the present invention is useful to extend the run life of the catalyst bed. The catalytically active ceramic filter units may be utilized to react diolefins or other polymer precursors and also to act as a filter and distributor. By filtering solids and partially reacting any polymer precursors, e.g., diolefins, fouling of the bed is reduced, effectively extending the run time of the reactor. In another embodiment of this invention, at least some of the ceramic filter units are formed of a ceramic which comprises a porous inorganic oxide selected from the group consisting of alumina, silica, silica-alumina, magnesia, silica-magnesia and titania. At least some of the ceramic filter units of the present invention may also contain a metal oxide, metal nitride, or metal carbide selected from the group consisting of titanium, zirconium, tungsten, silicon or boron. Another feature of this aspect of the present invention is that the ceramic filter units may contain a metal boride selected from the group consisting of titanium, zirconium or tungsten. Still a further aspect of the present invention includes at least some of the ceramic filter units may contain a zeolite selected from the group consisting of zeolite L, zeolite X and zeolite Y.

The method of the present invention for removing contaminants from an organic-based feed stream, in a chemical reactor may include the steps of providing a layer of ceramic filter units, at least some of the ceramic filter units should have a plurality of openings extending therethrough, at least some of the openings having a shape selected from the group consisting of ellipses or trisoids, the layer of ceramic filter units being in an amount sufficient to filter some or all of the contaminants from the organic-based feed stream, and passing the organic-based feed stream through the layer of ceramic filter units. The organic-based feed stream may be an organic-based liquid, a vapor phase, or both, and the contaminants may include dirt, iron oxide, iron sulfide, asphaltenes, coke fines, catalyst fines, sediments, other entrained foreign particulate matter or polymer precursors such as diolefins.

The ceramic filter units of the present invention should be provided in a layer in an amount sufficient to remove some or all of the contaminants from the organic-based feed stream. Preferably, the elliptical or trisoidal shaped openings extend axially along the longitudinal axis of the ceramic filter units. Another feature of the present invention for removing contaminants from a contaminated organic-based feed stream in a chemical reactor includes the steps of providing a layer of ceramic filter units, at least some of the filter units having a plurality of openings extending therethrough, at least some of the openings having a shape selected from the group consisting of ellipses or trisoids, and contacting the contaminated organic-based feed stream with the ceramic filter units to remove the contaminants from the contaminated organic-based feed stream. Another feature of the present invention may include the step of providing a decontaminated organic-based feed stream for further processing.

More particularly, the invention relates to a process for improving feed quality of organic-based feed streams to chemical reactors by providing a decontaminated organic based feed stream for processing in the chemical reactor. Preferably, the chemical reactors use discrete solid element catalyst beds. As used herein, the term chemical reactors may include hydrotreater, hydrorefiner, hydrocracker, reformer, alkylation, isomerization, and polymerization reactors, among others. The discrete solid catalyst particles may be contained in one or more fixed beds and in either an upflow, downflow or radial flow design.

An additional feature of the present invention may include the step of using the ceramic filter units of the present invention having an overall thickness which may be varied from about 1/8 to 1 1/2 inches, preferably from about 1/4 to 1/2 inches, more preferably from about 1/4 to 3/8 inches. An additional feature of the present invention may include using ceramic filter units in a variety of cross-sectional configurations. The cross-sectional configurations may include free form or polygonal closed plane shapes, including but not limited to ellipses and circles or substantially any polygonal configuration, such as triangles, quadrilaterals, and pentagons, among others. The cross-sectional configurations may include widths of about 1/4 to 3 inches at the widest point. Polygonal cross-sectional configurations may include sides having lengths of about 1/8 to 3 inches. In particular, substantially circular cross-sectional configurations of about 1/4 to 3 inch diameters; ellipses having minor axes of about 1/4 to 2 and major axes ranging from about 3/8 to 3 inches; square cross-sectional configurations of about 1/4 to 3 inch and rectangles having lengths of about 1/4 to 3 inches, and widths of about 1/4 to 3 inches may be used. Additionally, each ceramic filter unit periphery may be provided with a smooth or fluted periphery surface. The ceramic filter units may also be provided top and bottom surfaces that are substantially smooth. Optionally, one or both of the top and bottom surfaces may be provided with an irregular shape.

The number and size of the plurality of openings used may be varied to change the void fraction of the ceramic filter units. The void fraction of the ceramic filter units used may range from about 20 to 70 percentage void area, preferably from about 40 to 65 percentage void area, more preferably from about 50 to 65 percentage void area. Another feature of the present invention is to vary the packing factor of the ceramic filter units used to affect filtration of varying particle sizes.

The packing factor used may range from about 200 to 500 $ft_2/ft_3$, preferably from about 220 to 450 $ft_2/ft_3$, more preferably from about 240 to 400 $ft_2/ft_3$. In accordance with the invention, the size, shape and void area of the ceramic filter units used may be varied to change the packing factor of the randomly dumped ceramic filter unit layers.

The method of the present invention is useful to extend the run life of the catalyst bed. Catalytically active ceramic filter units may be utilized to react diolefins or other polymer precursors and also to act as a filter and distributor. By filtering solids and partially reacting any polymer precursors, e.g., diolefins, fouling of the bed is reduced, effectively extending the run time of the reactor. In accordance with another aspect of the present invention, the step of contacting the contaminated organic-based feed stream with the ceramic filter units may include depositing a catalyst on at least some of the ceramic filter units prior to contacting the contaminated organic-based feed stream. Another feature of this aspect of the present invention may include the use of at least some ceramic filter units having a plurality of openings selected from the group consisting of ellipses and trisoids as a substrate having a substantially uniform coating of a selected catalyst including a porous alumina coating with a Group VI-B metal or a Group VIII metal, or both. Preferably, the Group VI-B metal is molybdenum and preferably, the Group VIII metal is either nickel or cobalt. More preferably, the Group VI-B metal and Group VIII metal are impregnated into at least some of the ceramic filter units having a plurality of openings extending therethrough, at least some of the openings having a shape selected from the group consisting of ellipses and trisoids. In another embodiment of this invention, at least some of the ceramic filter units used may comprise a porous inorganic oxide selected from the group consisting of alumina, silica, silica-alumina, magnesia, silica-magnesia and titania. At least some of the ceramic filter units used in the present invention may also be a metal oxide, metal nitride, or metal carbide selected from the group consisting of titanium, zirconium, tungsten, silicon or boron. Another feature of this aspect of the present invention is using at least some ceramic filter units comprising a metal boride selected from the group consisting of titanium, zirconium or tungsten. Still a further aspect of the present invention includes using at least some ceramic filter units comprising a zeolite selected from the group consisting of zeolite L, zeolite X and zeolite Y.

In accordance with another aspect of the present invention, the present method of flow distribution in a chemical reactor includes the steps of: providing a layer of ceramic filter units, at least some of the ceramic filter units having a plurality of openings extending therethrough, at least some of the openings having a shape selected from the group consisting of ellipses and trisoids, at least some of the ceramic filter units having a plurality of flow passageways defined by the plurality of openings extending through the ceramic filter units; contacting an organic-based feed stream with the layer of ceramic filter units; and subdividing the organic-based feed stream into a plurality of smaller fluid streams by passing the organic-based feed stream through the plurality of flow passageways defined by the plurality of openings. A further feature of this aspect of the present invention may include the steps of removing contaminants from a contaminated organic-based feed stream, and providing a decontaminated and uniformly spread organic-based feed stream to a catalyst bed for further processing in the chemical reactor.

The method of the present invention for filtering organic-based feed streams in chemical reactors, when compared with prior art methods, has the advantages of: reducing the volume of ceramic materials required; lowering capital costs; improving the filtration of the solid particular matter from the feed streams; decreasing the pressure drop across the system; increasing run time of the reactor; lowering operating costs; increasing process safety; and reducing environmental concerns.

BRIEF DESCRIPTION OF THE DRAWINGS

In the drawings:

FIG. 4 is a perspective view of a circular shaped ceramic filter unit with a smooth periphery having a plurality of elliptical openings extending therethrough in accordance with the present invention;

FIG. 5 is a perspective view of a circular shaped ceramic filter unit with a fluted periphery having a central circular opening surrounded with a plurality of elliptical openings wherein all openings extend axially through the longitudinal axis of the ceramic filter unit in accordance with the present invention;

FIG. 6 is a perspective view of triangular shaped ceramic filter unit having a plurality of elliptical openings extending therethrough in accordance with the present invention;

FIG. 7 is a perspective view of a quadrilateral shaped ceramic filter unit having a plurality of elliptical openings extending therethrough in accordance with the present invention;

FIG. 8 is a perspective view of a pentagonal shaped ceramic filter unit having a plurality of elliptical openings extending therethrough in accordance with the present invention;

FIG. 9 is a perspective view of a hexagonal shaped ceramic filter unit having a plurality of elliptical openings extending therethrough in accordance with the present invention;

While the invention will be described in connection with the preferred embodiment, it will be understood that it is not intended to limit the invention to that embodiment. On the contrary, it is intended to cover all alternatives, modifications, and equivalents, as may be included within the spirit and the scope of the invention as defined by the appended claims.

DETAILED DESCRIPTION OF THE INVENTION

Figure 1:
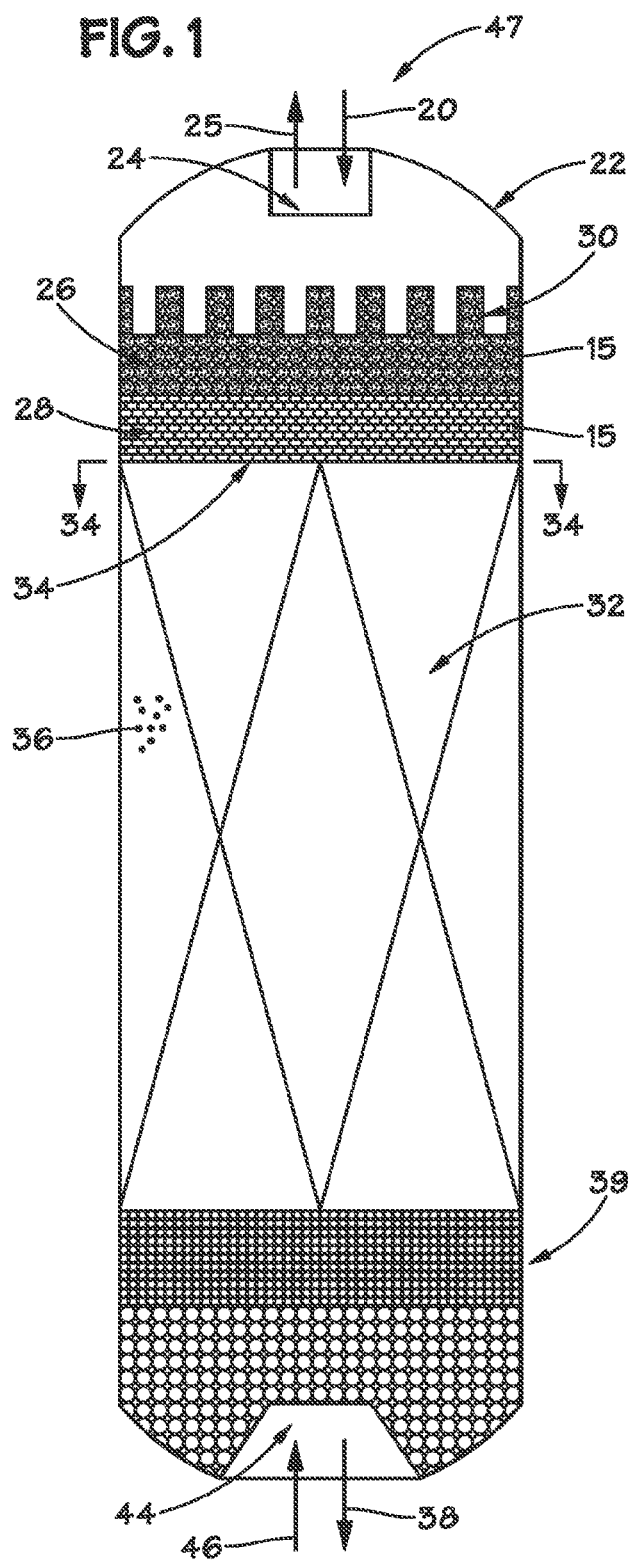
FIG. 1 is partial a cross-sectional side view of a single fixed bed chemical reactor showing a specific embodiment of the present invention.

With reference to FIG. 1, unless otherwise noted, for treatment of an organic-based feed stream, a single fixed bed chemical reactor 22 is shown. If the reactor 22 is of a downflow configuration, the contaminated organic-based feed stream 20 will enter the reactor 22 at the inlet 24 and exit the outlet 44 as stream 38. The invention may be used in fixed bed chemical reactors. Preferably, the present invention is used in one or more fixed beds, in either an upflow or downflow or radial flow configuration. As used herein, the term "chemical reactors" may include hydrotreaters, hydrorefiners, hydrocrackers, reformers, alkylation, isomerization and polymerization reactors, among others. Contaminants typically found in the feed stream include dirt, iron oxide, iron sulfide, asphaltenes, coke fines, catalyst fines, sediments or other entrained foreign particulate material.

Figure 14:
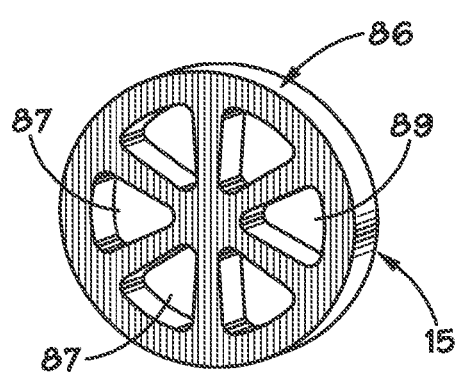
FIG. 14 is a perspective view of a circular shaped ceramic filter unit having a plurality of trisoidal openings extending therethrough in accordance with the present invention.

Still with reference to FIG. 1, a layer of ceramic filter units 15 (FIGS. 4-16), at least some having a plurality of openings 89 extending therethrough, at least some of the openings having a shape selected from the group consisting of ellipses 88 (FIGS. 4-5) or trisoids 87 (FIG. 14). A layer 26, preferably layers 26, 28, of ceramic filter units 15, wherein at least some of the ceramic filter units have a plurality of elliptical shaped openings 88 (FIGS. 4-5) or trisoidal shaped openings 87 (FIG. 14) is provided in the reactor, or vessel, 22 in an amount sufficient to filter the contaminants from the organic-based feed stream 20. Optionally, the number or size of elliptical shaped openings 88 (FIGS. 4-5), trisoidal shaped openings 87 (FIG. 14) or other shaped openings 108 (FIGS. 4-5) may be varied to change the void fraction of the ceramic filter units 15.

Optionally, but preferably, the size, shape and thickness of the ceramic filter units may also be varied to change the packing factor for the layer of ceramic filter units 26. As illustrated in FIG. 1, multiple layers 26, 28 may be provided wherein the packing factor of layer of ceramic filter units 26, 28 is graduated from a low value (larger void volume) in layer 26 to a higher value (smaller void volume) in layer 28 as the incoming organic-based feed stream flows through the ceramic filter units 15. The packing factors of the layers 26, 28 of ceramic filter units 15 may be graduated from a smaller packing factor to a larger packing factor to lessen the pressure drop through the reactor attributable to filtering of the suspended solids. Optionally, the present invention may be practiced with or without conventional basket screens 30.

The ceramic filter units 15 may be made from any commercially available ceramic precursors fire clays for example, ball clays or silicate-aluminum clays such as montmorillonite or preferably kaolinite clays such as those found in the Southeastern United States. Optionally, ceramic precursors such as cordierite, mullite, magnesia alumina, zirconia stabilized with magnesia or calcia, zirconia toughened alumina, and the like may also be used.

Still with reference to FIG. 1, in addition to filtering the contaminated organic-based feed stream 20, the ceramic filter units 15 may also enable a uniform distribution and flow of the incoming organic-based feed stream 20 to the catalyst bed 32. The incoming organic-based feed stream 20 may be distributed by passing the organic-based feed stream through a plurality of flow passageways 87, 88, 89, 108 (FIGS. 4, 5, 14). The flow passageways 87, 88, 89, 108 (FIGS. 4, 5, 14) are defined by the elliptical shaped openings 88 (FIG. 4), trisoidal shaped openings 87 (FIG. 14) or optionally, other shapes, such as circular openings 108 (FIGS. 4-5) extending through the ceramic filter units 15. Preferably, the openings 89 (FIGS. 4, 5, 14) extend axially through the ceramic filter units along their longitudinal axis. The layers 26, 28, of ceramic filter units 15 distribute the incoming organic-based feed stream 20 into a plurality of smaller fluid streams by resubdividing, a plurality of times, the smaller streams so that the incoming organic-based feed stream 20 is spread across the fluid entry cross section 34, taken along line 34-34, of the catalyst bed 32.

The organic-based feed stream 20 is reacted in the catalyst bed 32. Preferably the catalyst bed 32 contains discrete solid catalyst particles 36. Alternately, the filtering medium, or ceramic filter units, 15 may also be used in an upflow reactor configuration wherein the contaminated organic-based feed 46 would instead enter the vessel at the outlet 44 at the lower end 39 and the reacted organic-based stream 25 would exit the reactor at the inlet 24 at the upper end 47 of reactor 22.

As previously discussed, another advantage of the present invention is to react partially activated or activated ceramic filter units 15 with polymer precursors in a contaminated organic-based feed stream 20. Condensation polymerization of diolefins may occur in the reactor bed 32 after the contaminated organic-based feed stream 20 is heated, generally prior to introduction into the chemical reactor 22, thereby forming foulants in the reactor bed 32 itself which may gum or plug the bed 32. As the foulants form in the bed, they cannot be filtered from the contaminated organic 1 based feed stream 20 before flowing across the fluid entry cross section 34. Therefore, the layer or layers 26, 28 of ceramic filter units 15 may be coated with an alumina powder which may also act as a substrate for catalyst materials to form activated ceramic filter units 15.

As used herein, an "activated support" means: a ceramic filter unit 15, having at least some elliptical shaped openings 88 (FIGS. 4-5) or trisoidal shaped openings 87 (FIG. 14), which has been impregnated with catalyst materials; a ceramic filter unit 15 having at least some elliptical shaped openings 88 (FIGS. 4-5), or trisoidal shaped openings 87 (FIG. 14), which may contain an oxide, nitride, or carbide of a metal; or a ceramic filter unit 15 having at least some elliptical shaped openings 88 (FIGS. 4-5), or trisoidal shaped openings 87 (FIG. 14), which contains zeolite or porous inorganic oxides, e.g., alumina, silica, silica-alumina, magnesia, silica-magnesia or titania. As used herein, a "partially activated support" means an activated support material which has been purposefully made less active, or partially deactivated, in order to achieve a slower reaction rate or to partially react the materials contacted.

Coated ceramic filter units 15 may also be used, wherein the coating may comprise one of several conventional catalysts. Alumina may be used as an active coating. Preferably, alumina may be used as a support. The catalyst according to this invention preferably comprises a metal of Group VI-B or a member of Group VIII, or both, impregnated into an alumina-based support. Accordingly, the catalyst may comprise at least one of chromium, molybdenum and tungsten in combination with at least one of iron, nickel, cobalt, platinum, palladium and iridium. Of the Group VI-B metals, molybdenum is most preferred. The catalyst preferably will contain from about 2% to about 14% by weight of Group VI-B metal. Of the Group VIII metals, nickel and cobalt are most preferred. The amount of Group VIII metal in the catalyst is preferably from about 0.5% to about 10% by weight.

Figure 2:
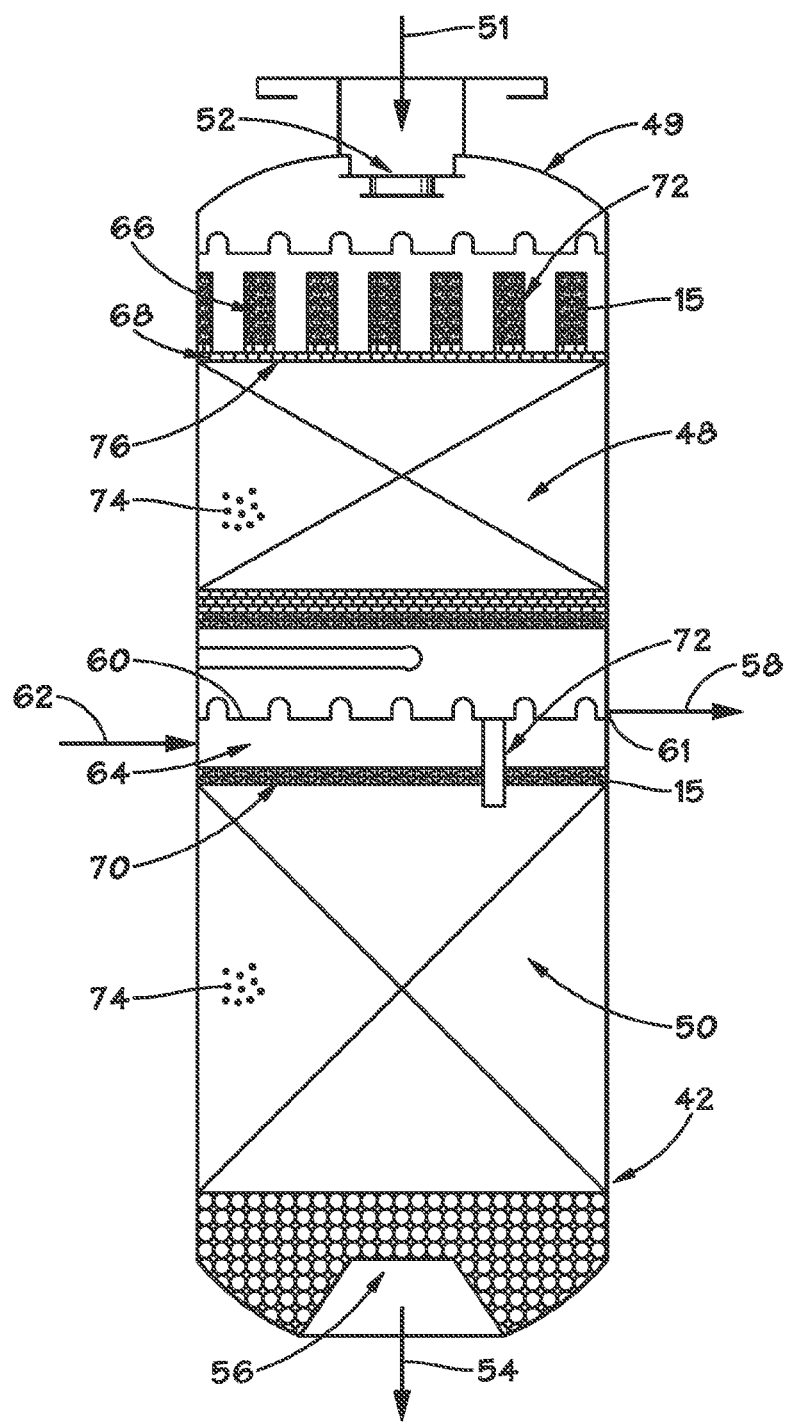
FIG. 2 is a partial cross-sectional side view of a multiple fixed bed chemical reactor showing another embodiment of the present invention.

With reference to FIG. 2, a multiple fixed bed chemical reactor 49 having two fixed catalyst beds 48, 50 with ceramic filter units 15 will be described. The reactor 49 is illustrated in a downflow configuration, wherein the contaminated organic-based feed stream 51 will enter the reactor 49 at the inlet 52 and the reacted organic-based stream 54 will exit the reactor at the outlets 56, 61. A partially reacted organic-based stream 58 may be accumulated at the outlet 61 of the first fixed bed 48 and withdrawn at the collector tray 60. The partially reacted organic-based stream 58 may be heated or quenched or otherwise treated before reintroduction into the reactor 49 as a partially reacted organic-based feed stream 62 at the mixing chamber 64. The partially reacted organic-based stream 58 may be removed for redistribution, heating, or other processing steps as required before reintroducing the partially reacted organic-based feed stream 62 into the reactor 49 for reaction with a succeeding catalyst bed 50. An additional layer 70 of ceramic filter units 15 having at least some elliptical shaped openings 88 (FIGS. 4-5), or trisoidal shaped openings 87 (FIG. 14), may be provided for filtration and distribution to remove any contaminants entrained from or formed by the processing equipment used in the additional processing steps such as dirt, iron oxide, iron sulfide, asphaltenes, coke fines, catalyst fines, sediments, or other entrained foreign particulate material. The reacted stream 54 exits the lower end 42 of the reactor 49 at the outlet 56.

Layers 66, 68, 70 of ceramic filter units 15 are provided in the reactor 49 below the inlet 52 and mixing chamber 64 in an amount sufficient to filter the organic-based feed stream 51 and the partially reacted organic-based feed stream 62. Optionally, the size, shape and thickness of the cross sections may also be varied to change the packing factor for the layers 66, 68 of ceramic filter units 15. Multiple layers may be provided wherein the packing factor of the layered ceramic filter units 66, 68 is graduated from a low value (larger void volume) in layer 66 to a higher value (smaller void volume) in layer 68 as the incoming organic-based feed stream flows through the ceramic filter units 15. Optionally, the present invention may be practiced with, or without, conventional basket screens 72. Preferably, the fixed catalyst beds 48, 50 contain discrete solid catalyst particles 74.

As previously discussed, an advantage of the present invention is that it may also be used to distribute the organic-based feed stream. The organic-based feed stream 51 may also be distributed while being filtered by subdividing the incoming organic-based feed into a plurality of smaller fluid streams. The organic-based feed stream 51 may be distributed or spread across the fluid entry cross section of the catalyst bed 76 by passing the organic-based feed stream 51 through a layer 66 or layers 66, 68 of ceramic filter units 15. The ceramic filters 15 resubdivide, a plurality of times, the smaller streams in a plurality of flow passageways 87, 88, 89, 108 (FIGS. 4, 5, 14). The organic-based feed 51 is then reacted in the catalyst bed 48, before being withdrawn as a partially reacted organic-based stream 58 at the collector plate 60. The method of filtration and distribution is then repeated for the partially reacted organic-based feed stream 62 as it flows into the mixing chamber 64 and passes through the ceramic filter units layer 70.

A further advantage of the present invention is that at least some of the ceramic filter units 15 may be activated or impregnated with catalyst to react with polymer precursors in organic-based feed streams 51, 62. As depicted in FIG. 2, layers 66, 68, 70 of ceramic filter units 15 at least some of the ceramic filter units having a plurality of openings 89 extending therethrough, at least some of the opening having a shape selected from the group consisting of ellipses 88 (FIGS. 4-5), or trisoids 87 (FIG. 14), may contain an activated support including porous inorganic oxides preferably selected from the group consisting of alumina, silica, silica-alumina, magnesia, silica-magnesia or titania or zeolites. The zeolites are preferably selected from the group consisting of zeolite L, zeolite X, and zeolite Y, which may be added to the ceramic filter units 15 as a substrate for catalyst materials. Optionally, the ceramic filter units 15 may be impregnated with catalyst materials which may be an oxide, nitride, carbide or boride of a metal as disclosed in U.S. Pat. No. 5,399,535, which is hereby incorporated by reference to the extent it is not inconsistent with the present invention.

Activated, or partially activated, ceramic filter units 15 may be used to control the hydrogenation rate of the diolefins or other polymer precursors to prevent fouling or gum formation. When endothermic reactions require the addition of heat to the partially reacted organic-based stream 58, preferably the layer 70 of ceramic filter units 15 is also activated or partially activated. The invention may also be practiced with at least some coated ceramic filter units 15, wherein the coating may comprise one of several conventional catalysts. Alumina may be used on an active coating or support. The catalyst according to this invention preferably comprises a metal of Group VI-B or a member of Group VIII, or both, impregnated into the active coating or support on the ceramic filter units 15. Accordingly, the catalyst may comprise at least one of chromium, molybdenum and tungsten in combination with at least one of iron, nickel, cobalt, platinum, palladium and iridium. Of the Group VI-B metals, molybdenum is most preferred. The catalyst preferably will contain from about 2% to about 14% by weight of Group VI-B metal. Of the Group VIII metals, nickel and cobalt are most preferred. The amount of Group VIII metal in the catalyst is preferably from about 0.5% to about 10% by weight. More preferably, the Group VI-B metal and Group VIII metal are impregnated directly into the ceramic filter units.

Figure 3:
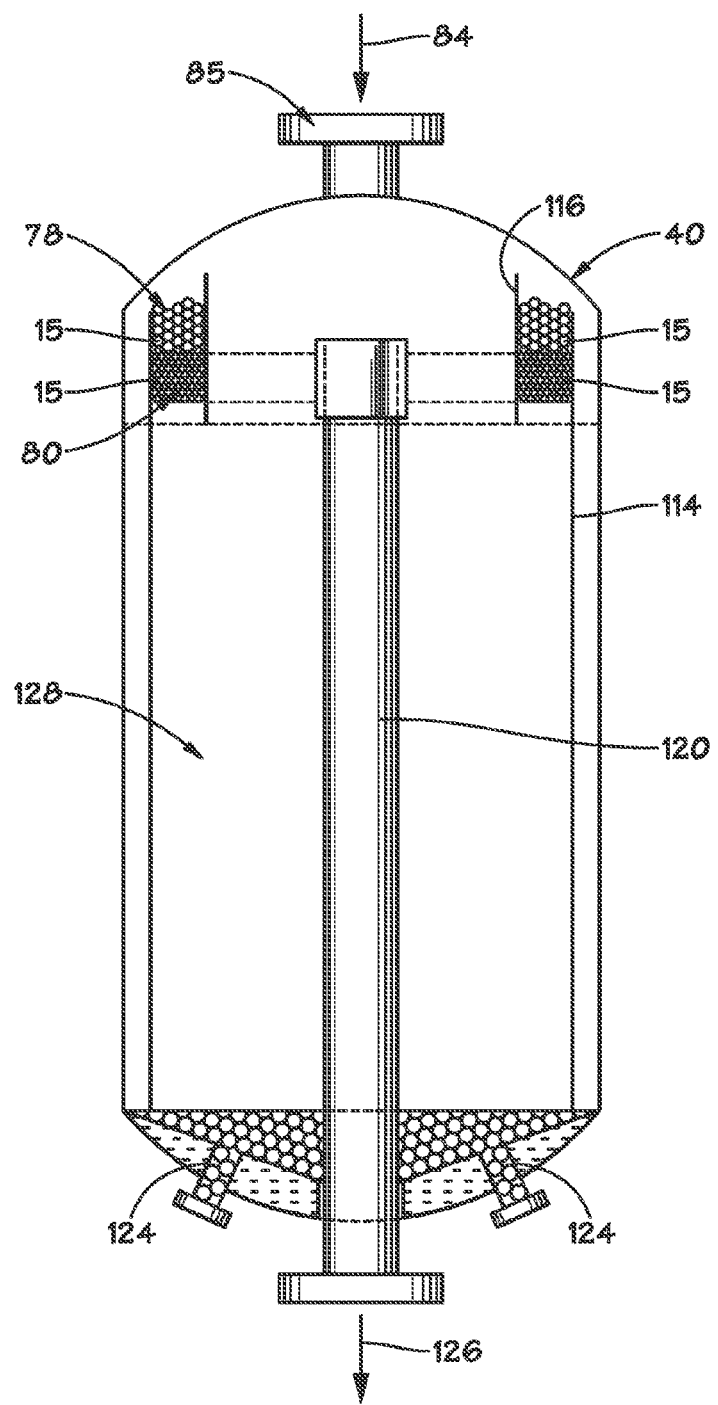
FIG. 3 is a partial cross-sectional side view of a radial flow reactor showing another embodiment of the present invention.
Figure 10:
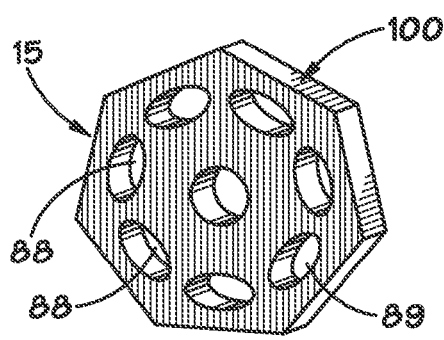
FIG. 10 is a perspective view of a heptagonal shaped ceramic filter unit having a plurality of elliptical openings extending therethrough in accordance with the present invention.
Figure 11:
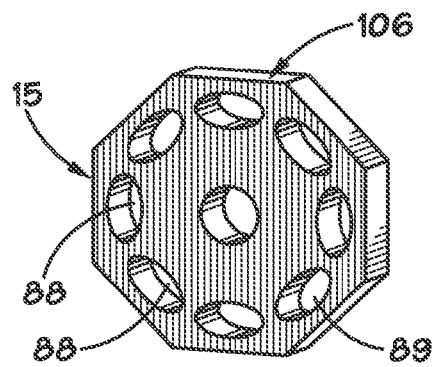
FIG. 11 is a perspective view of an octagonal shaped ceramic filter unit having a plurality of elliptical openings extending therethrough in accordance with the present invention.
Figure 12:
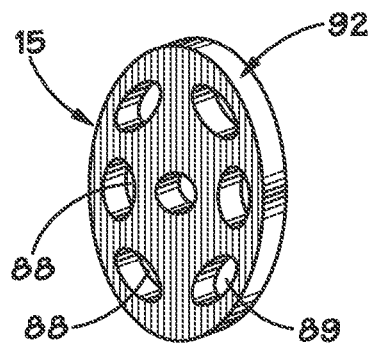
FIG. 12 is a perspective view of an elliptical shaped ceramic filter unit having a plurality of elliptical openings extending therethrough in accordance with the present invention.
Figure 13:
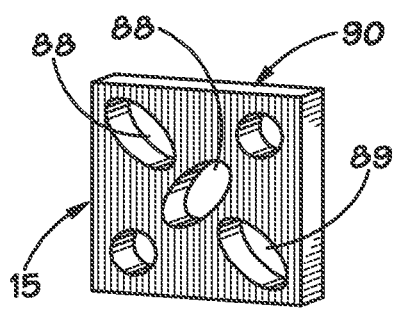
FIG. 13 is a perspective view of a square shaped ceramic filter unit having a plurality of elliptical openings extending therethrough in accordance with the present invention.

With reference to FIG. 3, for treatment of a contaminated organic-based feed in vapor form, a radial flow fixed bed chemical reactor 40 is illustrated. The contaminated organic-based feed in vapor form 84 will enter the radial flow reactor 40 at the inlet 85. A layer 78 of ceramic filter units 15, more preferably layers 78, 80 of ceramic filter units 15, is provided in the reactor, or vessel 40, between a deflection baffle 116 and the scallop 114. The layers 78, 80 of ceramic filter units 15 aid in filtering contaminants such as entrained dirt, iron oxide, iron sulfide, asphaltenes, coke fines, catalyst fines, sediments, or other foreign particulate material entrained in the contaminated organic-based vapor feed 84. Following filtration, the vapor is reacted in the fixed catalyst bed 128. The reacted organic stream 126 is discharged through the center pipe 120.

FIGS. 4 and 5 illustrate a specific embodiment of the present invention as a ceramic filter unit 15 having a circular shape, or cross-sectional configuration, 86 and at least some elliptical shaped openings 88 (FIGS. 4-5). Trisoidal shaped openings 87 may also be used (FIG. 14). Optionally, the ceramic filter units 15 may have other shaped openings 108 mixed with the elliptical shaped openings 88 (FIGS. 4-5) or the trisoidal shaped openings 87 (FIG. 14). The other shaped openings may have a circular shape, as illustrated in FIGS. 4-5 or may be irregular or other closed plane shapes, such as squares, clover leaves, or diamonds, among others. Optionally, the periphery surface of the ceramic filter units 15 may be smooth as shown by arrow 98 (FIG. 4) or be provided with flutes, or grooves, 102 (FIG. 5). As to the ceramic filter units 15 of FIGS. 4 and 5, although four openings 88 disposed about a circular shaped opening 108 are shown, it will be apparent to one of ordinary skill in the art that a greater, or smaller, number of openings 88 may be provided. For example, three openings 88 or five openings 88, could be utilized.

Figure 15:
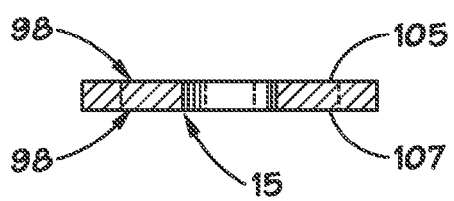
FIG. 15 is a side view, taken along the cross-section A-A of FIG. 4, showing a ceramic filter unit having substantially smooth top and bottom surfaces.
Figure 16:
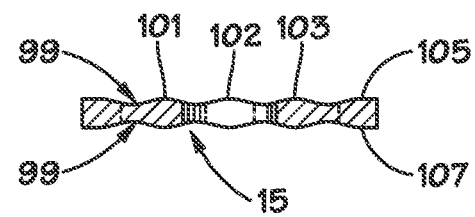
FIG. 16 is a side view, taken along the cross-section A-A of FIG. 4, showing a ceramic filter unit having irregularly shaped top and bottom surfaces.

With reference to FIG. 15, the top surface 105 and bottom surface 107 of the ceramic filter units 15 may also be used to contact solid particles and effectively remove the entrained solids by reducing the particle velocity below that of the fluid. Irregularly shaped top and bottom surfaces 105, 107 (FIG. 16) may augment this process. The amplitude and length of the ridges, rounded beads of waves may be adjusted based upon the particle sizes, fluid velocity and viscosity.

Other cross-sectional configurations used for the ceramic filter units may include triangles 94 (FIG. 6), quadrilaterals 96 (FIG. 7), pentagons 104 (FIG. 8), hexagons 110 (FIG. 9), heptagons 100 (FIG. 10), octagons 106 (FIG. 11), ellipses 92 (FIG. 12), and squares 90 (FIG. 13), among others. Each shape may be sized to individual specifications. Sizes for the shapes used may include circular shapes of about ¼ to 3 inches in diameter; elliptical shapes with major axes of about ¼ to 2 inches and minor axes of about ⅜ to 3 inches; and polygonal shapes with individual sides of the polygon of about ⅛ to 3 inches.

It is to be understood that the invention is not to be limited to the exact details of construction, operation, exact materials, or embodiments shown and described, as obvious modifications and equivalents will be apparent to one skilled in the art. For example, a non-uniform thickness cross section could be utilized rather than a uniform thickness for decreasing the packing factor, if desired. Accordingly, the invention is therefore to be limited only by the scope of the appended claims.

What is claimed is:

1. A method of fluid distribution in a chemical reactor comprising the steps of: providing a layer of ceramic filter units, at least some of the ceramic filter units having at least three openings extending therethrough, and at least some of the openings having a shape selected from the group consisting of ellipses and trisoids, at least some of the ceramic filter units having a plurality of flow passageways defined by the at least three openings extending through the ceramic filter units; contacting an organic-based feed stream with the layer of ceramic filter units; subdividing the organic-based feed stream into a plurality of smaller fluid streams by passing the organic-based feed stream through the plurality of flow passageways defined by the at least three openings, removing contaminants from a contaminated organic-based feed stream; and providing a decontaminated and uniformly spread organic-based feed stream to a catalyst bed for further processing in the chemical reactor, wherein one of the openings is in the center of the ceramic filter unit.

2. A method of fluid distribution in a chemical reactor comprising the steps of: providing a layer of ceramic filter units, at least some of the ceramic filter units having at least three openings extending therethrough, and at least some of the openings having a trisoid shape, at least some of the ceramic filter units having a plurality of flow passageways defined by the at least three openings extending through the ceramic filter units; contacting an organic-based feed stream with the layer of ceramic filter units; subdividing the organic-based feed stream into a plurality of smaller fluid streams by passing the organic-based feed stream through the plurality of flow passageways defined by the at least three openings, removing contaminants from a contaminated organic-based feed stream; and providing a decontaminated and uniformly spread organic-based feed stream to a catalyst bed for further processing in the chemical reactor.

* * * * *